US012718669B2

(12) United States Patent
Patrick et al.

(10) Patent No.: US 12,718,669 B2
(45) Date of Patent: Aug. 25, 2026

(54) SELF-CHECKOUT SECURITY VALIDATION CONTROL

(71) Applicant: TOSHIBA GLOBAL COMMERCE SOLUTIONS, INC., Durham, NC (US)

(72) Inventors: Jeremy V. Patrick, Cary, NC (US); Andrei Khaitas, McKinney, TX (US); Yeshai Bouskila, Plano, TX (US); Johanna E. Hinkle, South Bend, IN (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/981,172

(22) Filed: Dec. 13, 2024

(65) Prior Publication Data

US 2026/0170930 A1 Jun. 18, 2026

(51) Int. Cl.

| | |
|---|---|
| ***G07G 1/00*** | (2006.01) |
| ***G06Q 20/20*** | (2012.01) |
| ***G07G 3/00*** | (2006.01) |

(52) U.S. Cl.

CPC ......... *G07G 1/0072* (2013.01); *G06Q 20/208* (2013.01); *G07G 1/0054* (2013.01); *G07G 3/006* (2013.01)

(58) Field of Classification Search

CPC .. G07G 1/0036; G07G 1/0054; G07G 1/0072; G07G 3/006; G06Q 20/20; G06Q 20/208; G06V 20/68

USPC ............................... 235/383; 705/16; 902/22

See application file for complete search history.

(56) References Cited

U.S. PATENT DOCUMENTS

| | | | |
|---|---|---|---|
| 7,044,370 B2 | 5/2006 | Bellis, Jr. et al. | |
| 9,564,031 B2 | 2/2017 | Migdal et al. | |
| 2005/0187825 A1* | 8/2005 | Kirkley ................ | G07G 1/0054 705/18 |
| 2012/0197741 A1 | 8/2012 | Carlegren et al. | |
| 2015/0347997 A1* | 12/2015 | Delott .................. | G06Q 20/208 705/22 |
| 2022/0230173 A1* | 7/2022 | Sumpter ................... | G06T 7/62 |

OTHER PUBLICATIONS

Gamman et al., "Self-Checkout Loss: Three Ways to Rethink SCO Design", ECR loss, 2023, 120 pages.
ECR Retail Loss, "Self-Checkout Loss: Increasing Participation and Scan Accuracy Through Design", An ECR Research Paper, Oct. 2020, 71 pages.

* cited by examiner

*Primary Examiner* — Suezu Ellis

(74) *Attorney, Agent, or Firm* — Patterson + Sheridan, LLP; Gero G. McClellan

(57) ABSTRACT

Systems and methods for security validation control in a self-checkout system are provided. The method includes retrieving system-level transaction data receiving identity information related to a user, retrieving user-specific transaction data using the identity information, determining one or more validation parameters, which includes at least one validation percentage, weight tolerance threshold, and visual similarity threshold, selecting one or more items for validation within a self-checkout transaction, and, performing a validation check on each of the one or more items. The method also includes calculating validation performance indicators based on results of the validation check, and updating the system-level transaction data and the user-specific transaction data with the validation performance indicators.

14 Claims, 7 Drawing Sheets

SELF-CHECKOUT SECURITY VALIDATION CONTROL

BACKGROUND

Self-checkout systems offer customers the convenience of quick and autonomous checkout while reducing staffing costs for retailers. However, the nature of self-checkout also introduces potential risks, such as inadvertent item mis-scanning or incorrect charges, which may lead to customers being overcharged or facing other transaction errors. To manage these risks, self-checkout systems incorporate validation mechanisms, such as prompting staff for verification when certain items or transaction patterns trigger alerts, or using barcodes or radio frequency identification (RFID) codes to cross-check information. These validation tools help to verify transaction integrity and reduce errors that could impact customers.

DETAILED DESCRIPTION

Figure 1:
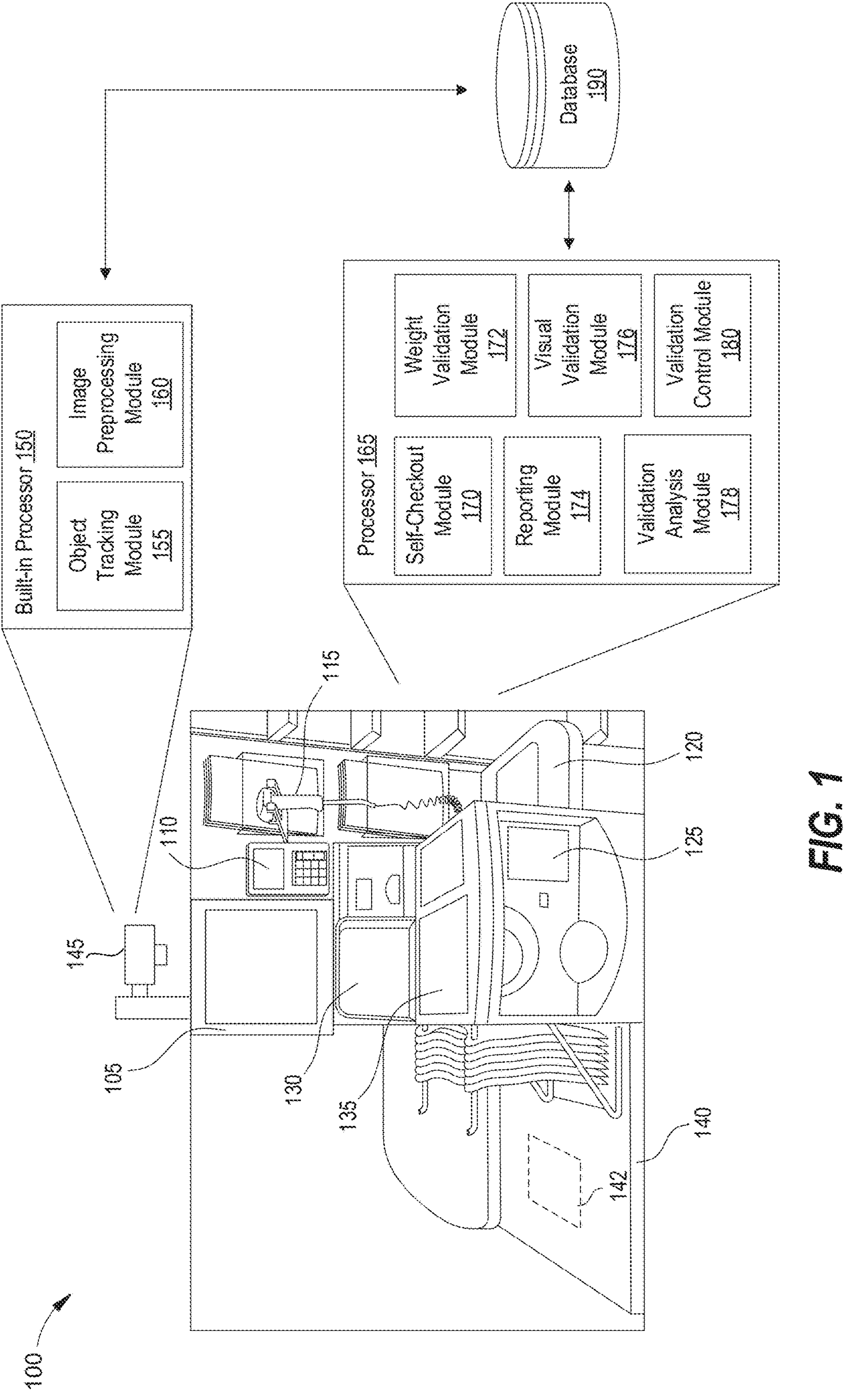
FIG. 1 depicts an example self-checkout device with validation control capabilities, according to some embodiments of the present discourse.

The present disclosure relates to self-checkout systems and, more specifically, to adjusting validation settings in a self-checkout system based on detected security or trust levels, utilizing system-level and/or user-specific transaction data.

As discussed above, validation control mechanisms support accurate transactions and help prevent errors that might occur during self-checkout processes. Barcode scanning is a practical method that involves cross-checking each item's barcode to confirm it matches the information in the checkout system. To further reduce errors or potential discrepancies, some systems may randomly select items within a transaction for manual verification, monitor the bagging area's weight to detect inconsistencies, and implement additional manual verification for certain items, such as age-restricted products or high-value electronics.

While these controls may improve transaction accuracy, they also have some limitations. Validation processes, for example, might interrupt the customer's shopping experience, extending the checkout time and leading to customer frustration if manual interventions are used overly frequently. To achieve an appropriate balance between transaction security (or accuracy) and frictionless customer experience, validation controls may require careful adjustment of configuration parameters, such as the percentage of items selected for validation or allowable weight tolerance thresholds. Existing self-checkout systems allow for manual adjustments, where store associates may modify these parameters manually to fine-tune the validation process. However, there is currently no mechanism to automatically adapt validation sensitivity based on specific indicators of a store's security risk or a customer's trustworthiness. This lack of dynamic adjustment can result in either overly stringent validation that impacts the customer experience or insufficient validation that fails to maintain transaction accuracy.

The present disclosure introduces methods, systems, and apparatuses that enable dynamic adjustment of validation sensitivity in a self-checkout system based on factors such as the store's security risk and/or an individual customer's trustworthiness. More specifically, the disclosed system utilizes various validation control methods to maintain transaction integrity, such as randomly selecting items within a transaction for validation and then applying weight checks or visual checks exclusively to those selected items to monitor their placement in the bagging area. Parameters such as the percentage of items selected for verification, the weight tolerance threshold, and the visual similarity threshold may be adjusted to control validation sensitivity. In the disclosed system, these adjustments are not manually configured. Instead, these adjustments are dynamically linked to detected security or trust levels. In some embodiments, the disclosed system accesses store transaction data to estimate the overall security risk level of the store. When individual customer identity is provided, the system may further evaluate customer trust scores by analyzing past transaction history specifically associated with the customer. Based on these risk metrics, the system automatically fine-tunes validation parameters to create a balanced approach that improves transaction security while maintaining a frictionless customer experience.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, micro-code, etc.) or an embodiment combining software and hardware aspects that may generally be referred to herein as a "circuit," "module" or "system."

FIG. 1 depicts an example self-checkout device 100 with validation control capabilities, according to some embodiments of the present discourse.

As illustrated, the example self-checkout device 100 includes various components designed to streamline the checkout process, including: a loading area 120, a bagging area 140, a display screen 105, a built-in scanner 130, a handheld scanner 115, a scale 135, a payment terminal 110, a receipt printer 125, and a camera 145 with a built-in processor 150.

The loading area 120 is used to hold a customer's shopping cart or basket before items are scanned. The bagging area 140 is used to place items after they have been scanned. The screen 105 displays a shopping list that shows details, such as each scanned item, its quantity and individual price, and the total price of all items. The customer may use the shopping list to verify their purchases in real time.

The built-in scanner 130 and handheld scanner 115 are used to scan one-dimensional (1D) or two-dimensional (2D) barcodes on products. Once scanned, the product's name and price are displayed on the screen 105 within the shopping list. The scale 135 may be used to weigh items to determine their price. The payment terminal 110 is used for processing payments, and the receipt printer 125 provides a physical receipt after the transaction is complete.

As depicted, a weight sensor 142 is installed under the bagging area 140. The weight sensor 142 may provide a validation check by comparing the detected weight of an item to the expected weight (e.g., stored in the system's database). If the weights do not match within an acceptable tolerance, the self-checkout system may flag a potential error. The weight sensor 142 may also detect if an unscanned item is placed in the bagging area 140. For example, if the bagging area's weight increases without a corresponding scan, it may signal that an extra item was added without scanning.

As illustrated, a camera 145 is mounted above or near the scanning area. The camera 145 captures images of an item as it is scanned, and provides the images to the main system of the self-checkout device (e.g., processor 165) for object recognition. If a mismatch is detected, such as the item that looks different from its expected appearance (e.g., stored in the database 190 and identified by using barcode), the system may flag the item for manual verification. In some embodiments, the camera 145 may be top-mounted or side mounted, positioned toward the scanning area. In some embodiments, the camera may be integrated within the scanner 130 itself.

In some embodiments, the validation checks (including the weight checks performed by the weight sensor 142 and/or the visual checks performed by the camera 145) to verify item accuracy may be applied selectively, instead of being applied to all scanned items or items placed in the bagging area. This selective approach helps to avoid delays and reduce the customer inconvenience by streamlining the checkout process. For example, the device 100 (e.g., via its validation control settings) may determine a percentage of items requiring security validation. This percentage may be configured or determined by considering factors like the store's general security requirements, customer trust levels (if applicable), and environmental factors (e.g., whether the customer is accompanied by a child). Using this generated percentage, the validation checks may only be applied to a subset of items within a transaction. In some embodiments, certain items may be specifically flagged as requiring validation due to specific characteristics, such as high value, frequent theft risk, or other security-related parameters. When these flagged items are scanned, validation checks may be automatically applied regardless of the general percentage settings. The selective validation approach reduces resources consumption. By applying validation checks only to a subset of items, the system reduces memory usage (e.g., to store images temporarily while evaluating them), processor time (e.g., for performing the actual image and weight analysis), and network congestion (e.g., if images need to be sent to an external system for analysis or if relevant data, such as expected weight or appearance, needs to be retrieved over the network).

As depicted, the camera 145 includes a built-in processor 150, which is configured to capture images and perform certain preprocessing tasks locally before providing the images to the main processor 165 for visual checks. In some embodiments, the built-in processor 150 may include software module (or programming instructions) specifically designed for object tracking and/or image capture and preprocessing. As depicted, the built-in processor 150 includes two software modules: the object tracking module 155 and the image capture & preprocessing module 160. The object tracking module 155 is configured to detect when an item enters the camera's field of view, track the item's position, and capture images at appropriate moments. The image preprocessing module 160 is designed to improve image quality, such as adjusting contrast, brightness, or sharpness to enhance image clarity and performing noise reduction to prepare the image before further analysis.

In some embodiments, the camera 145 may be installed above or near the bagging area (e.g., top-mounted or side-mounted), capturing images of an item as it is placed in the bagging area. In some embodiments, the camera 145 may lack a built-in processor 150. In this configuration, the object tracking module 155 and the image preprocessing module 160 may be integrated into the main processor 165 of the self-checkout device 100.

The main processor 165 serves as the central processing unit of the self-checkout device 100, managing transaction processes and adjusting relevant validation control settings to maintain secure and efficient checkout operations. As depicted, the main processor includes six software modules (or programming instructions): the self-checkout module 170, the weight validation module 172, the reporting module 174, the visual validation module 176, the validation analysis module 178, and the validation control module 180.

The self-checkout module 170 manages the self-checkout operations, including item scanning and weighting (using the built-in scanner 130 or the handheld scanner 115, and the scale 135), price calculation and transaction display (e.g., using the monitor 105), payment processing (e.g., using the payment terminal 110), and transaction finalization (e.g., by printing a receipt using the receipt printer 125).

The weight validation module 172 works closely with the weight sensor 142 (e.g., located under the bagging area 140) to conduct weight checks for items during the checkout process. The weight validation module 172 receives expected weight data for the scanned item and, using the weight sensor, verifies whether the actual weight of the item placed in the bagging area aligns with the reference weight stored in the system's database. When a validation percentage is applied, such as a percentage defining that a certain proportion of items (e.g., 20%) should undergo weight validation, the weight validation module 172 may randomly select items according to the percentage.

The visual validation module 178 receives the preprocessed images from the camera 145 and compares these images with reference images for visual validation. In some embodiments, the reference images may be stored in the database 190, which connects to the main processor 165 via wired or wireless links. The reference images may be identified by the barcode associated with each item. In some embodiments, the visual validation module 176 may use machine learning (ML) algorithms, such as convolutional neural networks (CNNs), to perform item recognition. The CNNs may be trained a large datasets of product images and learn the unique visual characteristics (e.g., size, shape, color) of various items. Once trained, the CNNs may conduct real-time comparison by extracting features from the captured images and matching them with stored features in the database 190. For example, when a customer scans a box of cereal, the object tracking module 155 may capture an image of the cereal box, and the visual validation module 176 may retrieve the reference image or associated features for the cereal box from the database 190. The trained models may the compare the visual features of the scanned box, such as packaging shape and colors, to those in the reference images. If the captured image matches the expected features, the visual check may be marked as passed. If there is no match, the visual check may be marked as a failure, triggering manual intervention for further validation by a store associate. In some embodiments, the CNNs may be used as a classifier, where the model processes the captured image to produce a classification label that directly identifies the item. In this configuration, the CNNs may be trained to recognize and categorize items by learning complex visual patterns from large datasets of labeled product images. When an item is scanned, the CNNs process the image and assigns it a classification label. Once the classification label is generated, the system compare it to the expected item identifier (e.g., barcode) to verify accuracy. If the classification label aligns with the expected identifier, the item passes the visual check. If the classification label differs from the expected item, the module 176 flags the discrepancy, prompting further validation or manual intervention.

The validation analysis module 174 is configured to analyze transaction data stored in the database 190 to assess relevant metrics reflecting the security level of the self-checkout system and the trustworthiness of an individual customer (if applicable). The database 190 may store both system-level transaction data and customer-specific transaction data for validation analysis.

As used herein, system-level transaction data refers to aggregated data collected from transactions across one or more self-checkout systems within a single location (or store) or across multiple locations (or stores). By analyzing the system-level transaction data, the validation analysis module 174 may determine various metrics (or indicators) reflecting historical validation performance and security status at the system level, such as validation failure rate and false intervention rate. As used herein, the validation failure rate refers to the percentage of items that go through a validation check (e.g., weight check, visual check, or others) and fail to meet expected criteria (e.g., proper placement in the bagging area, weight match, or visual match). Once the validation check fails, possible due to weight mismatches or visual discrepancies, manual verification by a store associate is triggered. The associate verifies the item and assesses the flagged failure to determine if it is accurate. During the verification, the associate may take actions such as voiding incorrect items, adding new items, or adjusting scanned information to ensure that the transaction is accurate. If the validation failure is found to be incorrect, suggesting the intervention is unnecessary, the associate simply confirms the transaction, allowing it to proceed without further adjustments. As used herein, the false intervention rate refers to the percentage of interventions that are considered unnecessary upon manual verification, indicating that the item flagged for intervention did not have any actual discrepancy.

In some embodiments, the system-level validation failure rate and/or system-level false intervention rate may be provided directly to the validation control module 180, which adjusts relevant validation settings (or parameters) based on the received metrics. For example, if the system-level validation failure rate exceeds a defined threshold, the validation control module 180 may increase the validation percentage to enhance scrutiny. Conversely, if the system-level validation failure rate falls below a defined threshold, the validation control module 180 may decrease the validation percentage to improve self-checkout efficiency. If the system-level false intervention rate exceeds a defined threshold, the validation control module 180 may increase similarity or weight tolerance thresholds to reduce unnecessary intervention. If the system-level false intervention rate falls below a defined threshold, the validation control module 180 may decrease similarity or weight tolerance thresholds to improve accuracy.

In some embodiments, the validation analysis module 178 may calculate a security score for the system based on the system-level validation failure rate and system-level false intervention rate. The security score reflects the overall risk level of the self-checkout system, with higher scores indicating a more secure and stable environment. Based on the security score, the validation control module 180 may adjust validation parameters accordingly to optimize security and efficiency, such as reducing the validation percentage and/or increasing the similarity or weight tolerance threshold when the security score is high (e.g., suggesting a stable and low-risk environment), and/or increasing the validation percentage and/or reducing the similarity or weight tolerance threshold when the security score is low (e.g., suggesting an insecure and high-risk environment).

As discussed above, in some embodiments, the database 190 may also include customer-specific transaction data, which may be linked to the customer's membership or loyalty card. This data includes detailed transaction records specific to a customer, including past validation outcomes, intervention history, and other relevant transaction behaviors. When a customer scans his or her member card before initiating or during the transaction, the customer-specific transaction data may be identified and retrieved from the database 190. By analyzing this data, the validation analysis module 178 may determine a validation failure rate and false intervention rate specific to the customer. These metrics allow the system to assess how frequently this customer's transaction encounter validation issues or unnecessary interventions. Based on these customer-specific metrics, the validation analysis module 178 may then generate a trust score for the customer. The trust score reflects the overall trustworthiness of the customer when performing self-checkout. A higher trust score indicates that the customer is generally reliable and low-risk, suggesting the customer tends to complete transactions accurately without significant corrections or interventions. A lower trust score suggests that the customer may require closer scrutiny due to a higher frequency of validation issues.

In some embodiments, the camera 145 may, in addition to capturing images of scanned items, also capture images of the customer to detect environmental factors, such as whether the customer is accompanied by a child or pet, occupied with a phone call, texting or browsing on his or her phone while shopping. These factors indicate situations where the customer's attention may be divided, leading to a higher likelihood of unintentional errors. The validation analysis module 178 may adjust the trust score based on this context. Depending on configuration and security requirements, the trust score may either be increased to relax validation sensitivity if the system prioritizes customer convenience in such situations, or decreased to apply greater scrutiny if the system's setting prioritize accuracy and security over convenience.

In some embodiments, the validation analysis module 178 may combine the system-level security score and the customer-specific trust score to develop an overall validation confidence score that reflects the combined risk level of the system and the customer for the current transaction. In some embodiments, the combined score may be generated by applying a weighted average, where weights are assigned to each score based on factors such as relevance or specific security requirements. The validation confidence score may then be provided to the validation control module 180, which adjust the relevant validation parameters (e.g., validation percentage, visual similarity threshold, or weight tolerance threshold) accordingly.

With the validation analysis module 178 and the validation control module 180, the self-checkout device 100 may dynamically adjust its validation settings based on updated transaction data. These adjusted parameters, such as validation percentage, weight tolerance threshold, and similarity threshold, may then be provided to the weight validation module 172 and visual validation module 176 to perform validation checks in the current transaction. Once the current transaction is completed and all validation checks have been performed, the reporting module 174 sends the transaction data to the database 190. This may include the current transaction records and any newly calculated metrics like false intervention rate and validation failure rate. By updating the database with the latest information, the system may refine future validation parameters based on ongoing data trends.

In some embodiments, the reporting module 174 may collect real-time transaction results from the self-checkout module 170, the weight validation module 172, and the visual validation module 176 within a single transaction, and provide this data to the validation analysis module 178 in real time. The validation analysis module 178 may then calculate metrics like the validation failure rate and false intervention rate as the transaction progresses and instructs the validation control module 180 to adjust relevant validation settings in real time within the same transaction. Through the real-time updates, the self-checkout device may dynamically respond to validation outcomes as they occur and adjust relevant settings based on detected trends or anomalies.

In FIG. 1, the object tracking module 155, the image preprocessing module 160, the self-checkout module 170, the weight verification module 172, the reporting module 174, the visual validation module 176, the validation analysis module 178, and the validation control module 180 are depicted as discrete components (or programming instructions) for conceptual clarity. In some embodiments, the operations of the depicted modules (and others not illustrated) may be combined or distributed across any number of computing devices.

Figure 2:
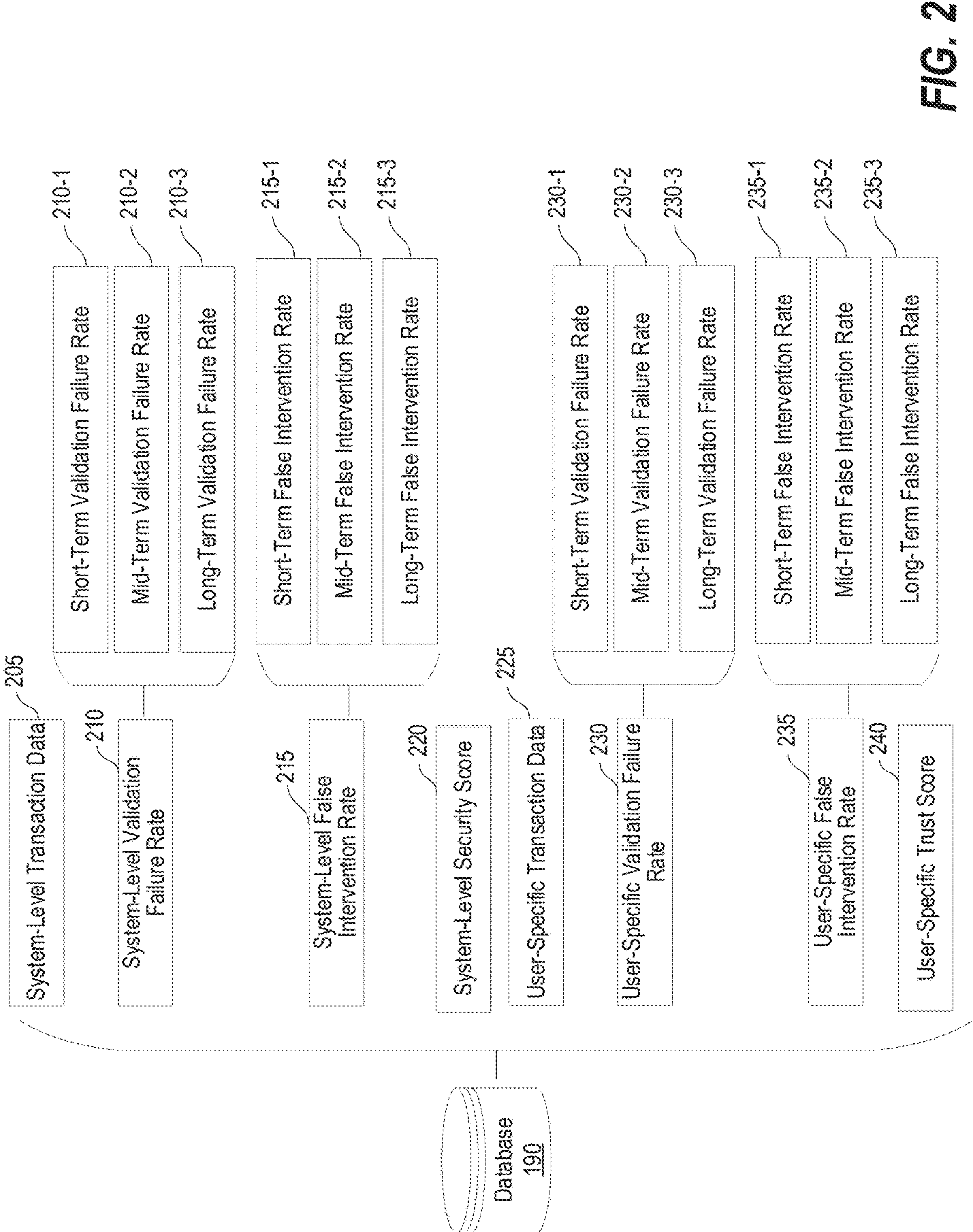
FIG. 2 depicts example types of data available for validation control in a self-checkout system, according to some embodiments of the present discourse.

FIG. 2 depicts example types of data available for validation control in a self-checkout system, according to some embodiments of the present discourse.

As depicted, the database 190 may store both system-level transaction data 205, with relevant pre-processed metrics 210-220, and user-specific transaction data 225 (also referred to in some embodiments as customer-specific transaction data), with relevant pre-processed metrics 230-240.

In some embodiments, the database 190 may provide only system-level transaction data 205 to a self-checkout device (e.g., 100 of FIG. 1). The transaction data 205 may include a variety of information, such as detailed transaction records listing items purchased, with records that may be collected either from the requesting device and/or aggregated from multiple devices within a single location or across multiple locations. The system-level transaction data 205 may also include records of validation checks performed on items during past transactions, specifying whether each validation check (e.g., weight or visual check) passed or failed. These records may then be used to calculate the system-level validation failure rate 210. In addition, the system-level transaction data 205 may further include details of manual interventions triggered during past transactions, including whether the store associate confirmed the failure by voiding incorrect items (indicating a correct intervention) or corrected the failure (indicating an unnecessary intervention). These records provide the basis for calculating the false intervention rate 215.

Upon receiving the system-level transaction data 205, the validation analysis module (e.g., 178 of FIG. 1) within the self-checkout device may analyze the data to compute relevant metrics, such as validation failure rate and false intervention rate. In some embodiments, the validation analysis module may also calculate a security score based on these metrics, which reflect the current system's overall security level. These computed metrics may then be provided to the validation control module (e.g., 180 of FIG. 1) to adjust validation settings (e.g., validation percentage, weight tolerance threshold, similarity threshold) accordingly. In this configuration, since only raw transaction data is provided, the processing load on the self-checkout device is relatively high, potentially leading to increased computational time and resource usage as the device performs in-depth analysis and calculations.

In some embodiments, the database 190 may be connected to an external computing system, which processes the system-level transaction data 205 and calculates metrics, such as the system-level validation failure rate 210 and system-level false intervention rate 215. When a self-checkout device request transaction data to perform validation analysis and adjust validation parameters, it may access and retrieve either the raw transaction data 205, the pre-processed metrics 210 and 215, or both. In some embodiments, three different types of validation failure rate may be calculated, including the short-term validation failure rate 210-1, mid-term validation failure rate 210-2, and long-term validation failure rate 210-3. The short-term validation failure rate 210-1 may be calculated based on recent transaction data (e.g., one month), showing immediate trends in validation performance. The mid-term validation failure rate 210-2 may be calculated from transaction data over the past three or six months. The long-term validation failure rate 210-3 may be calculated based on data from the past year, showing long-term trends in validation performance. Similarly, three types of false intervention rates 215 may also be calculated, including the short-term false intervention rate 215-1 (e.g., based on the past month), the mid-term false intervention rate 215-2 (e.g., calculated from 3 to 6 months of data), and the long-term false intervention rate 215-3 (e.g., based on data from the past year). With these metrics pre-processed by the external system, the validation analysis module within the self-checkout device may select the appropriate metric based on validation context (e.g., selecting short-term rates when recent and high-accuracy data is needed, and selecting long-term rates for establishing baseline settings). In some embodiments, the validation analysis module (e.g., 178 of FIG. 1) may calculate a security score for the system based on the validation failure rate and false intervention rate. The validation control module (e.g., 180 of FIG. 1) may then use the security score to make informed adjustments to parameters like validation percentage, weight tolerance threshold, and visual similarity threshold. In this configuration, the local processing load on the self-checkout device is significantly reduced, as it no longer needs to calculate these intensive metrics directly. Instead, the device may focus on utilizing these metrics to adjust its validation sensitivity without the computation cost of in-depth data analysis.

In some embodiments, the security score may be calculated by the external system and provided by the database 190 when requested by the self-checkout device (e.g., 100 of FIG. 1). With this setup, the validation analysis module (e.g., 178 of FIG. 1) may use the security score directly to send instructions to the validation control module (e.g., 180 of FIG. 1), adjusting validation parameters accordingly. This configuration further reduces the computational load on the self-checkout device, as it bypasses the need to calculate the security score internally. In some embodiments, the security score 220 may be segmented into different time-based scores to provide a detailed view of the system's risk level, including a short-term score (e.g., using the short-term validation failure rate 210-1 and short-term false intervention rate 215-1, reflecting the system's immediate risk level based on recent data), mid-term score (e.g., based on the mid-term validation failure rate 210-2 and mid-term false intervention rate 215-2), and long-term score (e.g., using the long-term validation failure rate 210-3 and long-term false intervention rate 215-3, indicating the system's risk level over time).

As depicted, the database 190 also store transaction data linked to a specific customer. When a customer provides his or her identity (e.g., by scanning a membership or loyalty card) before initiating the self-checkout process, the self-checkout device may access the database 190 to retrieve customer-specific transaction data 225 (also be referred to in some embodiments as user-specific transaction data). In this configuration, the device may adjust the validation settings based on both system-wide risk level and individual customer's trust score.

In some embodiments, once customer-specific data 225 is retrieved, the self-checkout device may analyze both system-level and customer-specific transaction data 205 and 225 directly. By analyzing the customer-specific data 225, the validation analysis module (e.g., 178 of FIG. 1) may determine individual validation failure rate and false intervention rate. These metrics may then be used to determine a trust score for the customer. A high trust score indicates that the customer has a reliable history of accurate transactions with minimal validation issues, while a low trust score suggests a higher need for scrutiny. With the system-level security score determined (e.g., using system-level metrics like validation failure rate and false intervention rate), the validation analysis module may combine the trust score with the security score to generate an overall validation confidence score. This score reflects the overall risk level of the transaction, considering both system-wide security needs and customer's individual trustworthiness. The validation confidence score may then be passed to the validation control module within the device, allowing it to adjust relevant validation parameters (e.g., validation percentage, weight tolerance threshold, visual similarity threshold) accordingly.

In some embodiments, the database 190 may connect to an external computing system that processes customer-specific transaction data 225 to calculate metrics, including the customer-specific validation failure rate 230 and false intervention rate 235. In some embodiments, the external computing system may use time-based segmentation to determine short-term 230-1, mid-term 230-2, and long-term validation failure rates 230-3, as well as short-term 235-1, mid-term 235-2, and long-term false intervention rates 235-3. These segmented metrics capture trends over recent, medium, and extended periods. When requested, these pre-computed metrics 230 and 235 may be provided directly to the self-checkout device. The validation analysis module of the device may use these metrics to determine a trust score for the customer. The trust score may then be combined with the system-level security score to yield an overall validation confidence score, which the validation control module uses to adjust validation settings. In this configuration, the local processing load on the self-checkout device is significantly reduced, as the device does not need to perform in-depth data analysis to calculate validation metrics.

In some embodiments, the external computing system may pre-calculate the trust score 240 for each customer, based on the relevant customer-specific validation failure rate 230 and false intervention rate 235. This approach further reduces the computing load on the self-checkout device. In this configuration, both the pre-calculated trust score 240 and the system-level security score 220 may be provided directly to the self-checkout device from the database 190. Upon receiving these scores, the validation analysis module of the device may combine these scores to generate an overall validation confidence score. With the validation confidence score, the validation control module may fine-tune the validation settings (e.g., validation percentage, weight tolerance threshold, visual similarity threshold). The adaptive adjustments allow the self-checkout device to improve security in high-risk cases while maintaining efficiency for trusted customers. In some embodiments, the external computing system may further improve validation precision by calculating short-term, mid-term, and long-term trust scores based on the customer's transaction history and validation outcomes over varying time frames.

In some embodiments, as discussed above, the self-checkout device may use a camera (e.g., 145 of FIG. 1) to capture images of the customer to detect environmental factors, such as whether the customer is accompanied by a child or pet, occupied with a phone call, or texting or interacting with his or her phone. Based on these factors, the device may adjust the received trust score 240 from the database 190. For example, the trust score 240 may be increased if the self-checkout device is set to prioritize customer convenience over accuracy in situations where the customer's attention may be distracted (e.g., when shopping with children). Conversely, the trust score 240 may be decreased if the device is set to prioritize accuracy and security, applying stricter validation to ensure transaction reliability under these potentially distracting conditions.

Figure 3:
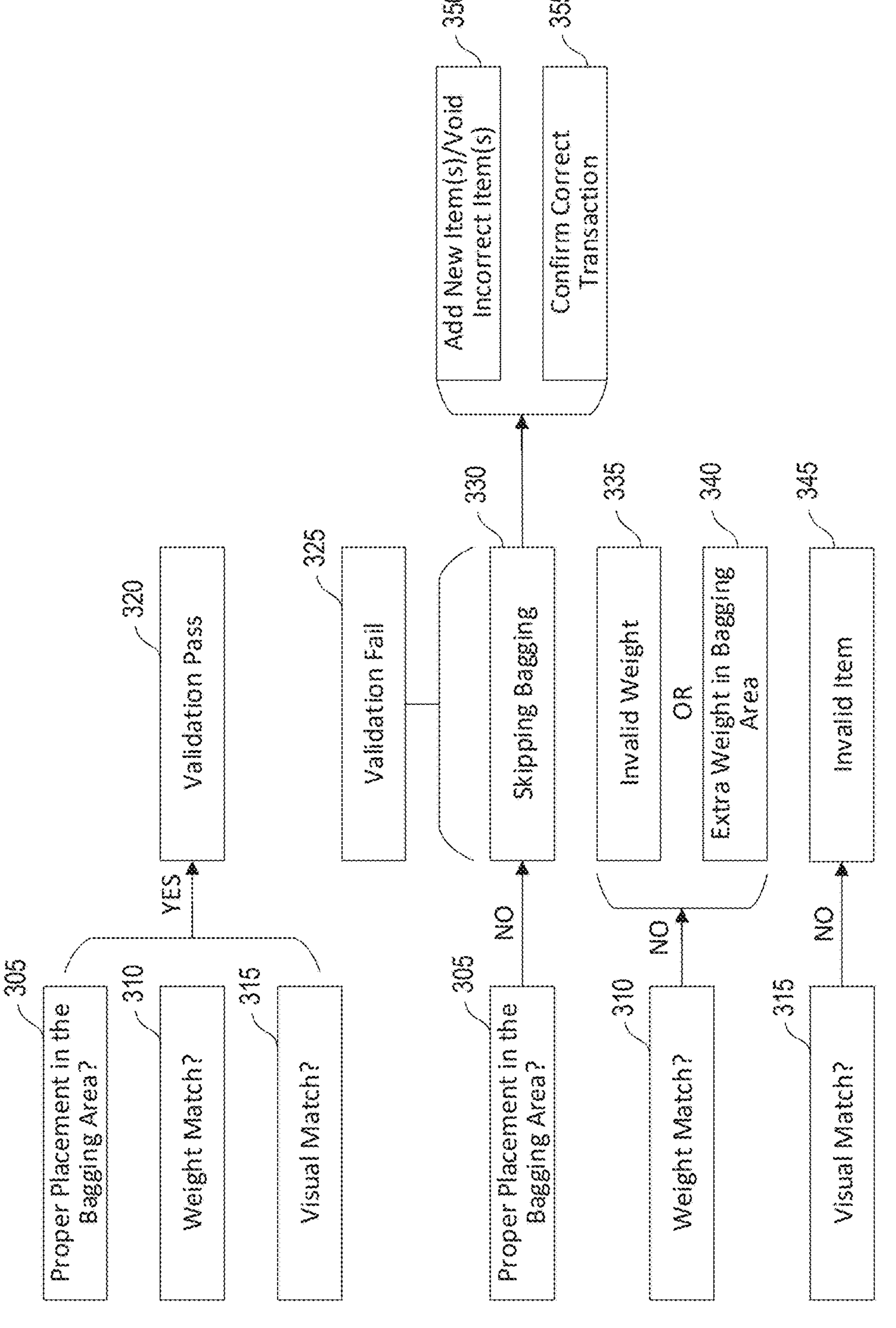
FIG. 3 depicts example validation checks and factors triggering manual interventions, according to some embodiments of the present discourse.

FIG. 3 depicts example validation checks and factors triggering manual interventions, according to some embodiments of the present discourse.

As discussed in FIGS. 1 and 2, the self-checkout device may implement a specified validation percentage (e.g., randomly selecting a subset of items within a transaction for validation) and then perform both weight and visual checks on the selected items. In this configuration, for a validation check to pass 320, three conditions must be met: (1) proper placement in the bagging area 305, which is confirmed by detecting an increase in weight immediately after scanning; (2) weight match 310, where the detected weight matches the expected weight in the system's database within an acceptable tolerance; (3) visual match 315, where the images of the item match reference images or features within an acceptable similarity threshold. If any of these conditions are not met, the validation check fails 325 and triggers manual intervention by a store associate.

In some embodiments, the validation failure rate (e.g., 210 or 230 of FIG. 2) may be calculated based on the results of the validation check. The validation failure rate represents the percentage of selected items that did not pass validation, and is calculated using the following equation:

$$\text{Validation Failure Rate} = (\text{Number of Items Failed Validation}) / (\text{Total Number of Items Under Validation Checks}) \times 100\%$$

The number of items that failed validation is the count of items that did not meet all three validation conditions (proper placement, weight match, and visual match). The total number of items under validation checks is the total count of items selected for validation according to the specified validation percentage.

If any of these conditions 305-320 are not met, the validation check fails. When the condition of proper placement 305 is not met, it may indicate the customer having scanned an item but not yet placed it in the bagging area. In this situation, the self-checkout process pauses, and the display screen (e.g., 105 of FIG. 1) on the device prompts the customer with an alert like "Skipping Bagging?" 330. When the condition of weight match 310 is not met, it may be due to either an incorrect item placed in the bagging area, or there are additional and unscanned items in the bagging area. In this situation, the display screen shows an alert such as "Invalid Weight" 335 or "Extra Weight in Bagging Area" 340, requesting the customer to seek assistance from a store associate. If the condition of visual match 315 is not met, it may suggest that an incorrect item has been scanned, or there is a potential item substitution. In this situation, the transaction pauses, and the display screen shows "Invalid Item" 345, requesting manual intervention to confirm or correct the item.

Once a validation check fails and an alert is prompted, a store associate steps in to manually verify the item and checkout details. If the associate finds no issues with the item list or placement, the associate may confirm the correct list 355 by clicking a confirmation button, marking the intervention as unnecessary and allowing the transaction to proceed. If an error is detected, the associate may adjust the transaction list 350 by adding missing items, voiding incorrect items, or adjusting the weight to align with the actual product. Based on the outcomes of these manual checks, the false intervention rate (e.g., 215 or 235 of FIG. 2) may be determined. The false intervention rate reflects the proportion of interventions that are unnecessary, and is calculated as follows:

$$\text{False Intervention Rate} = (\text{Number of Unnecessary Interventions}) / (\text{Total Number of Interventions}) \times 100\%$$

The number of unnecessary interventions is the count of manual interventions where no actual issue is found, and the total number of interventions is the total count of interventions triggered.

Using the validation failure rate and false intervention rate, the self-checkout device may evaluate the system's security level and/or the customer's trustworthiness. Based on these metrics, the device may adjust its validation sensitivity to achieve an optimal (or at least improved) balance between security and efficiency. When the validation failure rate and the false intervention rate indicate a stable system and a reliable customer, the device may reduce validation requirements to speed up the transactions (e.g., lowering the validation percentage or relaxing thresholds for weight and visual checks). If the validation failure rate and the false intervention rate suggest a higher-risk system or a customer requiring closer validation, the device may increase validation sensitivity to prevent potential errors or fraud (e.g., raising the validation percentage or tightening thresholds for weight and visual checks).

The three conditions 305-315 as depicted in FIG. 3 are provided for conceptual clarity. In some embodiments, additional conditions may be defined when other validation techniques are used in the self-checkout transaction.

Figure 4:
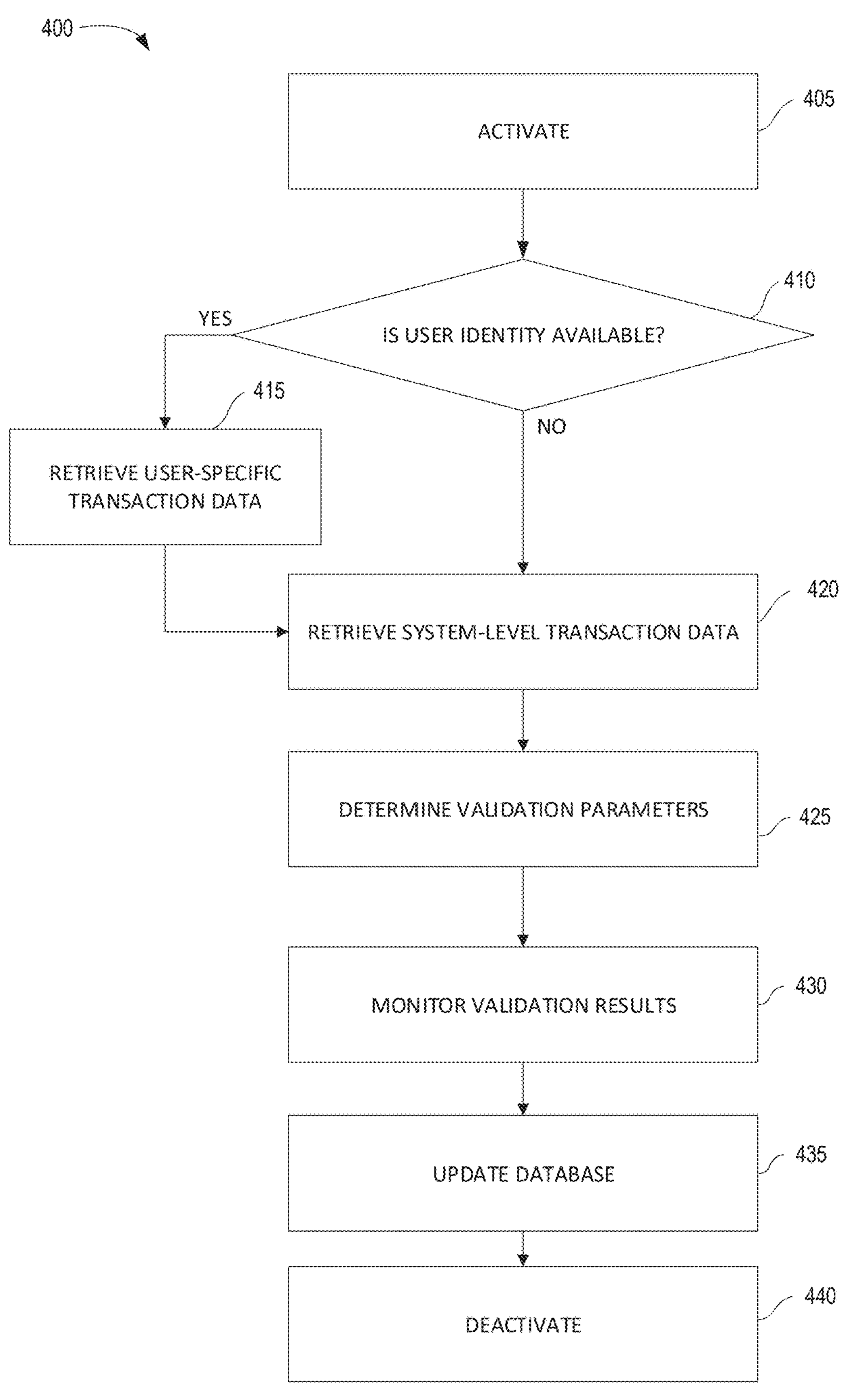
FIG. 4 depicts an example method for retrieving transaction data, adjusting validation parameters, and applying validation checks in a self-checkout system, according to some embodiments of the present discourse.
Figure 7:
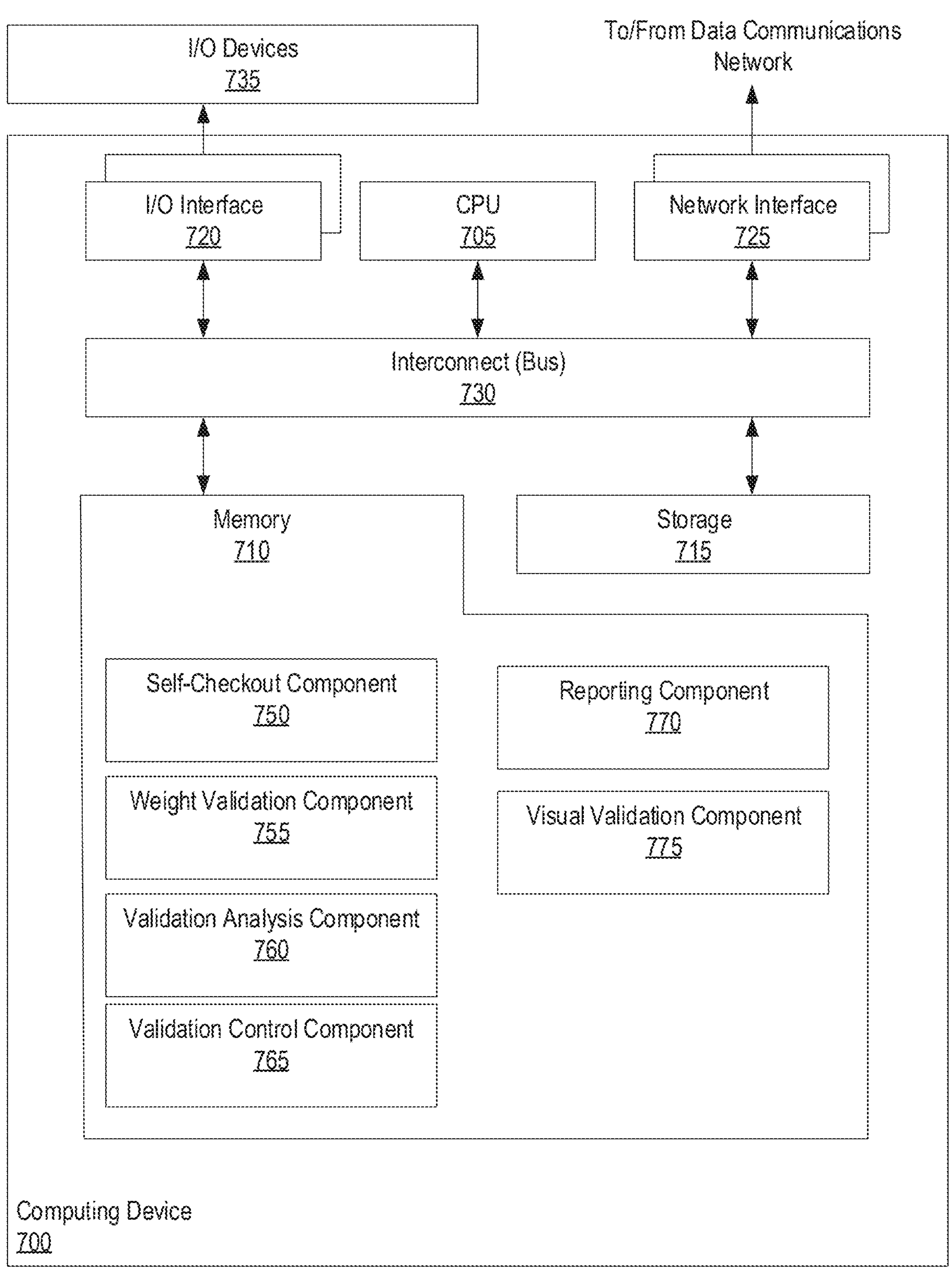
FIG. 7 depicts an example computing device configured to perform various aspects of the present disclosure, according to some embodiments of the present disclosure.

FIG. 4 depicts an example method 400 for retrieving transaction data, adjusting validation parameters, and applying validation checks in a self-checkout system, according to some embodiments of the present discourse. In some embodiments, the method 400 may be performed by one or more computing devices or systems, such as the self-checkout device 100 as depicted in FIG. 1, or the computing device 700 as depicted in FIG. 7.

At block 405, a self-checkout device is activated by a customer to start a self-checkout transaction. The activation may involve the customer interacting with the device by tapping its screen (e.g., 105 of FIG. 1), scanning an item, or clicking a "Start Checkout" button.

At block 410, the self-checkout device determines whether the customer has provided identity information, such as by scanning a membership or loyalty card or entering an account number. If identity information is provided, the method 400 proceeds to block 415, where the device retrieves customer-specific transaction data (also referred to in some embodiments as user-specific transaction data) (e.g., 225 of FIG. 2) and relevant metrics (e.g., the validation failure rates 230, false intervention rates 235, trust score 240 of FIG. 2) from the database (e.g., 190 of FIG. 1). The customer-specific data allows the device to personalize validation settings for the customer. In parallel or subsequent to customer-specific data retrieval, the device, at block 420, accesses and retrieves system-level transaction data (e.g., 205 of FIG. 2) and relevant metrics (e.g., the validation failure rates 210, false intervention rates 215, trust score 220 of FIG. 2) from the database. Based on both customer-specific and system-level data, the self-checkout device may adjust validation settings to reflect both store-wide security levels and the individual customer's reliability.

If no identity information is provided, the method 400 moves directly to block 420, where the self-checkout device only retrieves system-level transaction data. In this configuration, the self-checkout transaction proceeds with general validation settings based on store-wide security levels, without specific customization for the individual customer.

At block 425, the self-checkout device adjusts validation settings (or parameters) based on the retrieved data. In embodiments where only system-level transaction data is available, adjustments to validation parameters may be based directly on system-level performance metrics. For example, if the validation failure rate falls within a defined range, indicating that most of selected items pass validation checks (e.g., weight and/or visual checks), the device may reduce the validation percentage to improve transaction efficiency. If the validation failure rate exceeds a certain threshold, suggesting a high failure rate among selected items, the device may increase the validation percentage to put more items under validation. Additionally, thresholds for weight and/or visual checks may be adjusted based on the false intervention rate. For example, if the false intervention rate is high (e.g., exceeding a certain threshold, indicating that most interventions are unnecessary), the device may increase weight tolerance or similarity thresholds to reduce unnecessary stops. In contrast, a low false intervention rate may allow the device to perform more strict checks by lowering these thresholds.

In some embodiments, a security score may be generated based on both the validation failure rate and false intervention rate. The security score reflects the overall system risk level, and may be used to guide adjustments to the validation percentage and tolerance thresholds. For example, a high security score may prompt the device to lower validation percentage and/or increase tolerance thresholds for weight and/or visual checks. A lower security score indicates higher risk and may lead the device to increase validation percentage and/or decrease tolerance thresholds.

In some embodiments, such as when both system-level and customer-specific data are available, multiple performance metrics may be determined, including system-level validation failure rate, system-level false intervention rate, customer-specific validation failure rate, and customer-specific false intervention rate. In this configuration, adjusting validation sensitivity may rely on an overall evaluation of system and customer data, as a single metric may not adequately reflect the current security needs. More specifically, the self-checkout device may first calculate a security score based on system-level metrics (e.g., system-level validation failure rate, system-level false intervention rate), as well as a trust score based on customer-specific metrics (e.g., customer-specific validation failure rate, and customer-specific false intervention rate). In some embodiments, the trust score may be further adjusted based on detected environmental factors (e.g., whether the customer is accompanied by a child). The security score and trust score may then be combined into an overall validation confidence score, which provides a comprehensive risk assessment for the current transaction. In some embodiments, the validation confidence score may be calculated using the weight average as follows:

$$\text{Validation confidence score} = (W_s \times \text{Security Score}) + (W_1 \times \text{Trust Score}),$$

where $W_s$ and $W_t$ are weights assigned to the security score and trust score, respectively.

In some embodiments, the weights assigned to each score, $W_s$ and $W_t$, may be determined based on various factors, including relevance and specific security requirements (e.g., stores in high-theft areas may increase $W_s$ to prioritize system-wide security). With the confidence score, the device may adjust the relevant validation parameters. For example, if the confidence score falls below a defined threshold, indicating a stable system and a reliable customer, the device may decrease the validation percentage and/or increase tolerance thresholds for weight and/or visual checks. If the confidence score exceeds a defined threshold, the device may increase the validation percentage and/or lower tolerance thresholds to apply stricter checks.

In some embodiments, the adjustments of validation parameters may involve fine-tuning around default values. For example, the self-checkout device may include a default validation percentage set at 20%, which can be adjusted up or down based on the system's security score and/or individual customer's trust score (if available). A default weight tolerance may be set to allow for minor discrepancies (e.g., within a 5% margin), and this threshold may be tightened or relaxed based on the detected security and/or trust levels.

At block 430, with the determined validation parameters, the self-checkout device applies validation checks during the checkout process. This involves randomly selecting items for validation based on the defined validation percentage. For each selected item, the device conducts weight and/or visual checks according to preset tolerance thresholds. The self-checkout device records the validation results for each item. When validation fails and triggers manual intervention, the device records the result of the intervention, noting whether the validation failure is confirmed as correct or if any corrections have been made by the store associated.

At block 435, the device updates the database (e.g., 190 of FIG. 1) with current transaction data. The update includes the item list, relevant validation outcomes, and manual intervention results.

At block 440, the self-checkout device finalizes the transaction by processing payment, printing a receipt (if needed), and completing any final tasks associated with the checkout process. Once completed, the device is deactivated and reset, waiting for the next customer to initiate a new self-checkout transaction.

Figure 5:
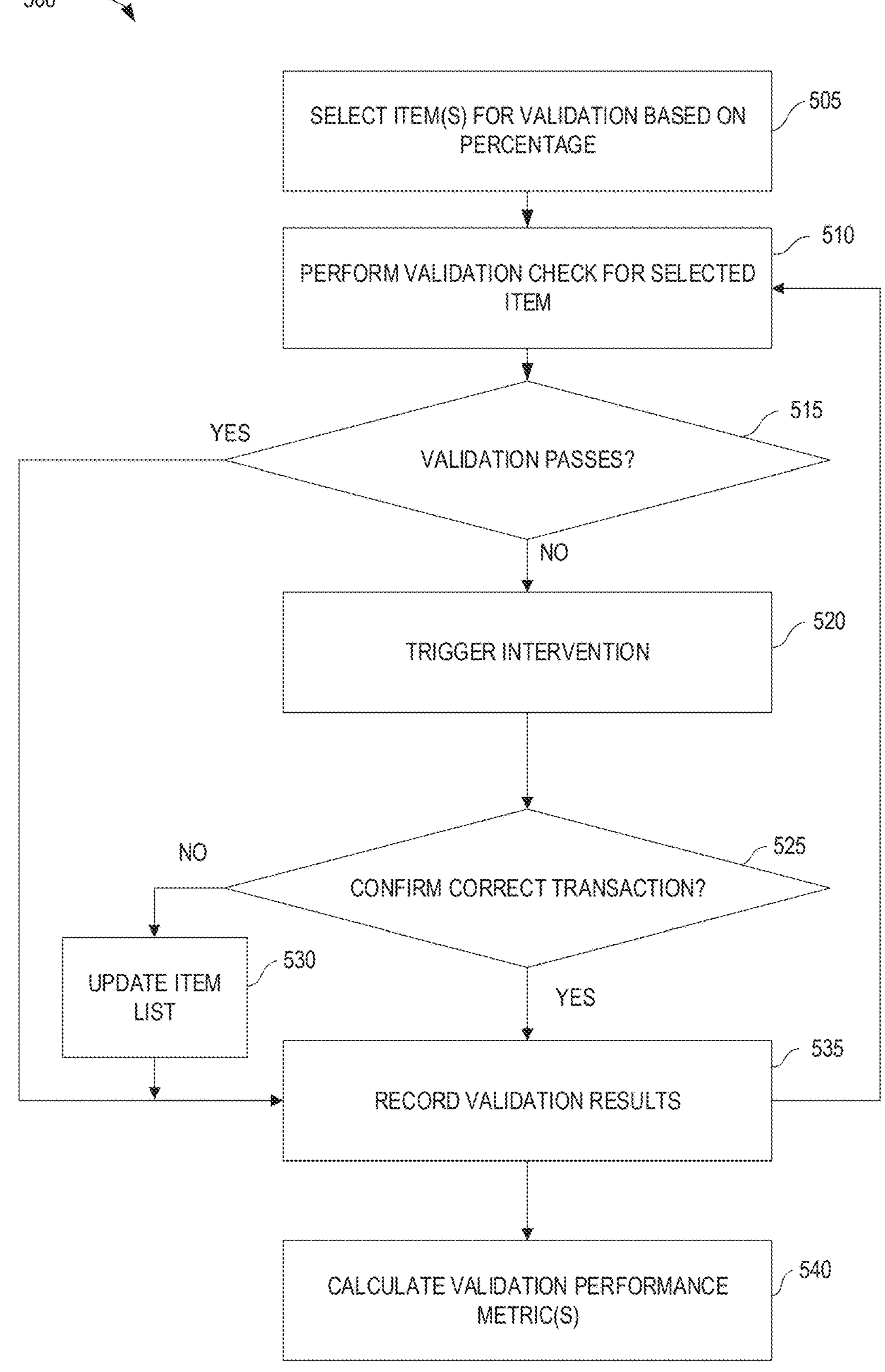
FIG. 5 depicts an example method for performing validation checks using adjusted validation parameters, according to some embodiments of the present discourse.

FIG. 5 depicts an example method 500 for performing validation checks using adjusted validation parameters, according to some embodiments of the present discourse. In some embodiments, the method 500 may be performed by one or more computing devices or systems, such as the self-checkout device 100 as depicted in FIG. 1, or the computing device 700 as depicted in FIG. 7.

The depicted example method 500 provides detail steps performed by a self-checkout device to implement validation checks after relevant parameters have been set up (at block 425 of FIG. 4).

At block 505, the self-checkout device randomly selects items for validation based on defined validation percentage. For example, if the percentage is set to 5%, an approximate 1 in 5 items may be chosen for validation.

At block 510, for each selected item, the device performs either weight check or visual check, or both. When performing the weight check, the item's actual weight is measured (e.g., via a weight sensor 142 installed underneath the bagging area, as depicted in FIG. 1) and compared to its reference weight in the database (e.g., 190 of FIG. 1). If a weight tolerance threshold (e.g., within a 5% margin) is set, the item passes the check if the difference between measured weight and reference weight falls within this margin. When performing visual check, the device captures an image of the selected item (e.g., via a camera 145 installed near or above the scanning area, as depicted in FIG. 1) and compares the image to reference images (or visual features) in the database. Using the visual similarity threshold (e.g., 90% similarity), the device evaluates if the item visually matches the expected product. As discussed in FIG. 2, when both visual and weight checks are implemented, for the item to pass validation, all three conditions (e.g., proper placement in the bagging area 305, weight match 310, and visual match 315) may be met. If any of these conditions are not met, the validation check fails.

At block 515, the device determines if the item passes the validation. If yes, the method 500 proceeds to block 535, where the device records the validation results. If the item fails, the method 500 proceeds to block 520.

At block 520, a manual intervention is triggered for items that fail the validation check. The intervention may involve pausing the current transaction and displaying a prompt for a store associated to review the item and transaction details. The associate evaluates whether the validation failure is accuracy by examining the item's placement, weight, and visual match against the expected list. Depending on the finding, the associate may confirm the transaction as correct (indicating the intervention is unnecessary) or make adjustments, such as adding missing items or voiding incorrect entries.

At block 525, if the transaction list is confirmed as correct, the method 500 proceeds to block 535, where the device records the result, marking the intervention as unnecessary. If any errors are detected, the method 500 moves to block 530, where the device updates the list according to received instructions from the store associate (e.g., adding missing items or voiding incorrect entries). The method 500 then proceeds to block 535, where the device records the intervention outcomes.

The operations from block 510 (performing validation checks) through block 535 (recording validation and intervention results) may be repeated for each selected item in the transaction until all items have been checked and the transaction is completed. At block 540, after the transaction is completed, the self-checkout device calculates validation performance metrics for the current transaction, such as the validation failure rate and the false intervention rate. The device may then send the collected transaction data to the database. In some embodiments, the update may include the current item list, the validation results, and manual intervention outcomes. By updating the database with these results, the self-checkout device may dynamically refine its validation sensitivity for future transactions based on evolving performance data.

In some embodiments, the calculation of metrics may occur before completing the entire transaction and instead may occur while the transaction is pending. For example, the self-checkout device may calculate metrics after a set interval, such as 5 or 10 minutes after starting the current transaction, or after a specific number of items have been scanned (e.g., 20 items). The device may then use these metrics in real time to adjust its validation sensitivity within the same transaction. For example, if the customer accurately scans and places the first 20 items without triggering validation errors, the device may recognize this pattern and relax the validation checks for the remaining items. The real-time adjustments capability allow the self-checkout device to balance efficiency with accuracy dynamically, based on the customer's behavior during the transaction.

Figure 6:
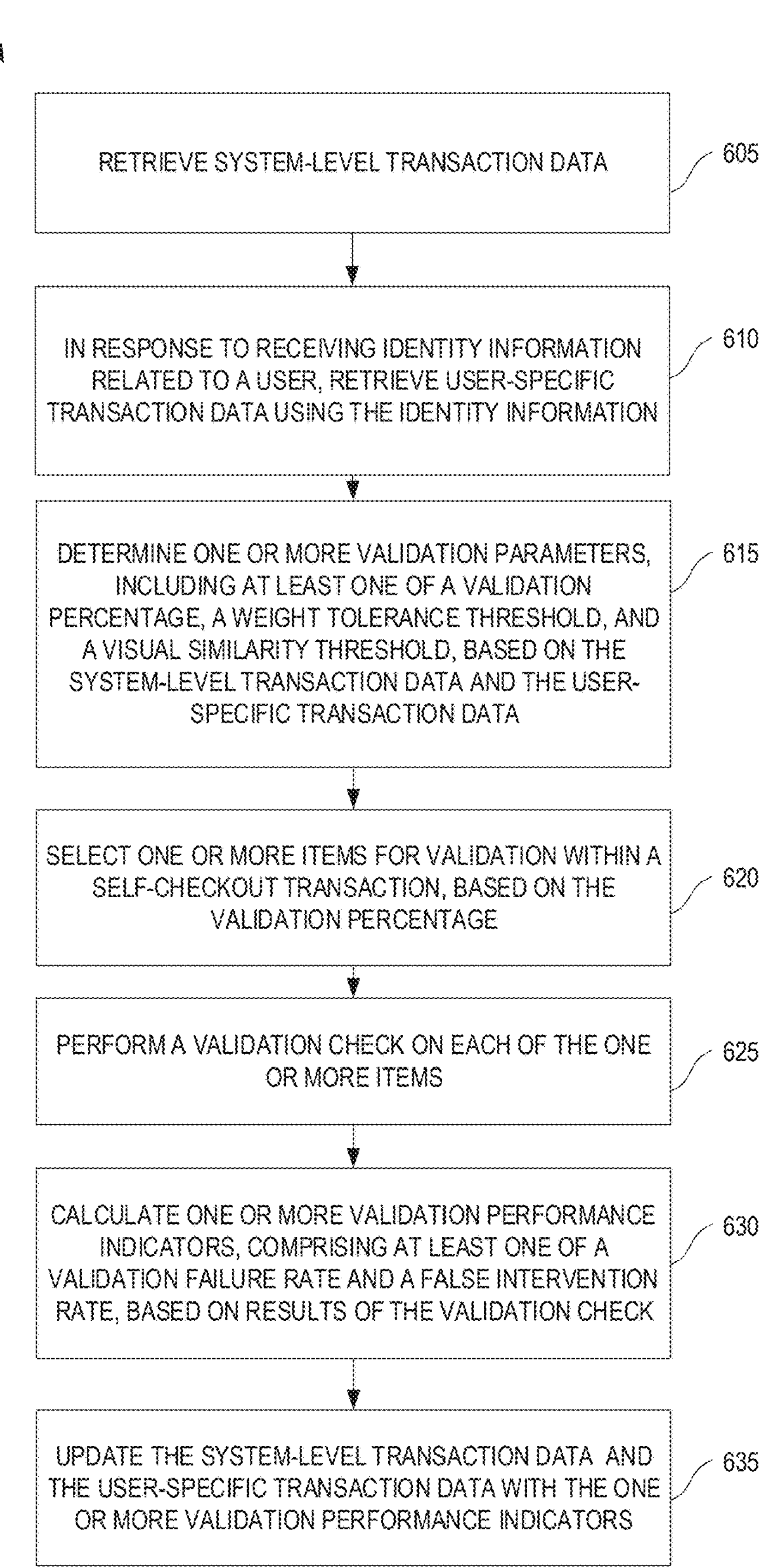
FIG. 6 is a flow diagram illustrating an example method for validation control in a self-checkout system, according to some embodiments of the present disclosure.

FIG. 6 is a flow diagram illustrating an example method 600 for validation control in a self-checkout system, according to some embodiments of the present disclosure.

At block 605, a self-checkout device (e.g., 100 of FIG. 1) retrieves system-level transaction data (e.g., 205 of FIG. 2).

At block 610, in response to receiving identity information related to a user, the self-checkout device retrieves user-specific transaction data (e.g., 225 of FIG. 2) using the identity information.

At block 615, the self-checkout device determines one or more validation parameters, comprising at least one of a validation percentage, a weight tolerance threshold, and a visual similarity threshold, based on the system-level transaction data and the user-specific transaction data (as depicted by block 425 of FIG. 4).

At block 620, the self-checkout device selects one or more items for validation within a self-checkout transaction, based on the validation percentage (as depicted by block 505 of FIG. 5).

At block 625, the self-checkout device performs a validation check on each of the one or more items (as depicted by block 510 of FIG. 5).

At block 630, the self-checkout device calculates one or more validation performance indicators, comprising at least one of a validation failure rate and a false intervention rate, based on results of the validation check (as depicted by block 540 of FIG. 5).

At block 635, the self-checkout device updates the system-level transaction data and the user-specific transaction data with the one or more validation performance indicators (as depicted by block 435 of FIG. 4).

In some embodiments, performing the validation check on each of the one or more items may comprise performing a weight check on each of the one or more items, the weight check comprising detecting a weight of an item, from the one or more items, retrieving an expected weight of the item from a database using a code associated with the item, comparing the detected weight with the expected weight, and determining whether a difference between the detected weight and the expected weight falls within the weight tolerance threshold.

In some embodiments, performing the validation check on each of the one or more items may comprise performing a visual check on each of the one or more items, the visual check comprising capturing an image of an item, from the one or more items, extracting one or more visual features from the image, retrieving visual reference data for the item from a database using a code associated with the item, determining a similarity between the image and the visual reference data, and determining whether the similarity falls within the visual similarity threshold.

In some embodiments, the self-checkout device may calculate a security score based on the system-level transaction data, calculate a trust score based on the user-specific transaction data, generate a validation confidence score by combining the security score and trust score, where the validation confidence score is calculated as a weighted average of the security score and the trust score, with weights assigned to each respective score based on validation sensitivity, and adjust the one or more validation parameters based on the validation confidence score.

In some embodiments, adjusting the one or more validation parameters based on the validation confidence score may comprise decreasing the validation percentage in response to the validation confidence score being higher than a defined score threshold, or increasing the validation percentage in response to the validation confidence score being lower than the defined score threshold.

In some embodiments, adjusting the one or more validation parameters based on the validation confidence score may comprise increasing the weight tolerance threshold in response to the validation confidence score being higher than a defined score threshold, or decreasing the weight tolerance threshold in response to the validation confidence score being lower than the defined score threshold.

In some embodiments, adjusting the one or more validation parameters based on the validation confidence score may comprise increasing the visual similarity threshold in response to the validation confidence score being higher than a defined score threshold, or decreasing the visual similarity threshold in response to the validation confidence score being lower than the defined score threshold.

In some embodiments, the self-checkout device may, in response to an absence of the identity information, calculate a security score based on the system-level transaction data, and adjust the one or more validation parameters based on the security score.

In some embodiments, adjusting the one or more validation parameters based on the security score may comprise decreasing the validation percentage in response to the security score being higher than a defined score threshold, increasing the validation percentage in response to the security score being lower than the defined score threshold, increasing the weight tolerance threshold in response to the security score being higher than the defined score threshold, decreasing the weight tolerance threshold in response to the security score being lower than the defined score threshold, increasing the visual similarity threshold in response to the security score being higher than the defined score threshold, or decreasing the visual similarity threshold in response to the security score being lower than the defined score threshold.

FIG. 7 depicts an example computing device 700 configured to perform various aspects of the present disclosure, according to some embodiments of the present disclosure. In some embodiments, the computing device 700 may be integrated into a self-checkout device (e.g., 100 of FIG. 1) or connected remotely to the self-checkout device via wired links (e.g., Ethernet cable) or wireless links (e.g., Wi-Fi).

As illustrated, the computing device 700 includes a CPU 705, memory 710, storage 715, one or more network interfaces 725, and one or more I/O interfaces 720. In the illustrated aspect, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally considered to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (e.g., keyboards, monitors, camera 145 with built-in processor 150, as depicted in FIG. 1) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated aspect, the memory 710 includes a self-checkout component 750, a weight validation component 755, a validation analysis component 760, a validation control component 765, a reporting component 770, and a visual validation component 775.

The self-checkout component 750 may correspond to the module 170 as depicted in FIG. 1. The self-checkout component 750 manages the functions of the self-checkout process, including item scanning, price calculating, payment processing, and transaction finalization. The weight validation component 755 may correspond to the module 172 as depicted in FIG. 1. The weight validation component 755 works in conjunction with a weight sensor to perform weight checks for items placed in the bagging area. In some embodiments, the weight check may include comparing the item's actual weight to the reference weight and verifying accuracy if the weight difference falls within a set tolerance threshold. The validation analysis component 760 may correspond to the module 178 as depicted in FIG. 1. The validation analysis component 760 analyzes system-level and, if available, customer-specific transaction data to calculate metrics such as the validation failure rate and false intervention rate. In some embodiments, the validation analysis component 760 may further generate a security score for the system and/or a trust score for individual customers (if customer-specific data is available). The validation control component 765 may correspond to the module 180 as depicted in FIG. 1. The validation control module may adjust validation settings, such as validation percentage, weight tolerance, and visual similarity threshold, based on performance metrics (or indicators) determined by the validation analysis component 760. The validation control component 765 fine-tunes these settings to maintain a balance between security and efficiency in the checkout process. The reporting component 770 may correspond to the module 174 as depicted in FIG. 1. The reporting component 770 communicates with the database, retrieving and updating transaction data and validation performance metrics. The visual validation component 775 may correspond to the module 176 as depicted in FIG. 1. The visual validation component 775 performs visual checks, comparing captured images with reference images and using similarity thresholds to verify if a correct item is being scanned.

Although depicted as discrete components for conceptual clarity, in some aspects, the operations of the depicted components (and others not illustrated) may be combined or distributed across any number of components. Further, although depicted as software residing in memory 710, in some aspects, the operations of the depicted components (and others not illustrated) may be implemented using hardware, software, or a combination of hardware and software.

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the described embodiments, a user may access applications (e.g., self-checkout validation control) or related data available in the cloud. For example, the self-checkout validation control application could execute on a computing system in the cloud and perform dynamic control adjustments. In such a case, the self-checkout validation control application could dynamically adjusts adjust validation parameters like validation percentage and thresholds for weight and/or visual check, and store records of transaction data and relevant metrics at a storage location in the cloud. Doing so allows a user to access this information from any computing system attached to a network connected to the cloud (e.g., the Internet).

While the foregoing is directed to one or more embodiments, other and further embodiments may be devised without departing from the basic scope thereof, and the scope thereof is determined by the claims that follow.

What is claimed is:

1. A method, comprising:

retrieving system-level transaction data;

receiving identity information related to a user;

responsive to receiving identity information related to the user, retrieving user-specific transaction data using the identity information;

determining one or more validation parameters based on the system-level transaction data and the user-specific transaction data, wherein the one or more validation parameters comprises at least one of a validation percentage, a weight tolerance threshold, or a visual similarity threshold;

calculating a security score based on the system-level transaction data;

calculating a trust score based on the user-specific transaction data;

generating a validation confidence score by combining the security score and trust score, wherein the validation confidence score is calculated as a weighted average of the security score and the trust score, wherein a weight is assigned to each respective score based on validation sensitivity; and adjusting the one or more validation parameters based on the validation confidence score;

selecting one or more items for validation within a self-checkout transaction, based on the validation percentage;

performing a validation check on each of the one or more items;

responsive to performing the validation check on each of the one or more items, calculating one or more validation performance indicators, the one or more validation performance indicators comprising at least one of a validation failure rate and a false intervention rate; and updating the system-level transaction data and the user-specific transaction data with the one or more validation performance indicators.

2. The method of claim 1, further comprising:

performing a weight check on each of the one or more items, wherein the weight check further comprising:

detecting a weight of an item, from the one or more items;

retrieving an expected weight of the item from a database using a code associated with the item;

comparing the detected weight with the expected weight; and determining that a difference between the detected weight and the expected weight falls within the weight tolerance threshold.

3. The method of claim 1, further comprising:

performing a visual check on each of the one or more items, wherein the visual check further comprising:

capturing an image of an item, from the one or more items;

extracting one or more visual features from the image;

retrieving visual reference data for the item from a database using a code associated with the item;

determining a similarity between the image and the visual reference data; and determining that the similarity falls within the visual similarity threshold.

4. The method of claim 1, wherein adjusting the one or more validation parameters based on the validation confidence score comprises:

decreasing the validation percentage in response to the validation confidence score being higher than a defined score threshold; and increasing the validation percentage in response to the validation confidence score being lower than the defined score threshold.

5. The method of claim 1, wherein adjusting the one or more validation parameters based on the validation confidence score comprises:

increasing the weight tolerance threshold in response to the validation confidence score being higher than a defined score threshold; and decreasing the weight tolerance threshold in response to the validation confidence score being lower than the defined score threshold.

6. The method of claim 1, wherein adjusting the one or more validation parameters based on the validation confidence score comprises:

increasing the visual similarity threshold in response to the validation confidence score being higher than a defined score threshold; and decreasing the visual similarity threshold in response to the validation confidence score being lower than the defined score threshold.

7. A system, comprising:

one or more memories collectively containing one or more programs; and one or more processors, wherein the one or more processors are configured to, individually or collectively, perform an operation comprising:

retrieving system-level transaction data;

receiving identity information related to a user;

responsive to receiving identity information related to the user, retrieving user-specific transaction data using the identity information;

determining one or more validation parameters based on the system-level transaction data and the user-specific transaction data, wherein the one or more validation parameters comprises at least one of a validation percentage, a weight tolerance threshold, or a visual similarity threshold;

calculating a security score based on the system-level transaction data;

calculating a trust score based on the user-specific transaction data;

generating a validation confidence score by combining the security score and trust score, wherein the validation confidence score is calculated as a weighted average of the security score and the trust score, wherein a weight is assigned to each respective score based on validation sensitivity; and adjusting the one or more validation parameters based on the validation confidence score;

selecting one or more items for validation within a self-checkout transaction, based on the validation percentage;

performing a validation check on each of the one or more items;

responsive to performing the validation check on each of the one or more items, calculating one or more validation performance indicators, the one or more validation performance indicators comprising at least one of a validation failure rate and a false intervention rate; and updating the system-level transaction data and the user-specific transaction data with the one or more validation performance indicators.

8. The system of claim 7, further comprising:

performing a weight check on each of the one or more items, wherein the weight check further comprising:

detecting a weight of an item, from the one or more items;

retrieving an expected weight of the item from a database using a code associated with the item;

comparing the detected weight with the expected weight; and determining that a difference between the detected weight and the expected weight falls within the weight tolerance threshold.

9. The system of claim 7, further comprising:

performing a visual check on each of the one or more items, wherein the visual check further comprising:

capturing an image of an item, from the one or more items;

extracting one or more visual features from the image;

retrieving visual reference data for the item from a database using a code associated with the item;

determining a similarity between the image and the visual reference data; and determining that the similarity falls within the visual similarity threshold.

10. The system of claim 7, further comprising:

decreasing the validation percentage in response to the validation confidence score being higher than a defined score threshold; and increasing the validation percentage in response to the validation confidence score being lower than the defined score threshold.

11. The system of claim 7, further comprising:

increasing the weight tolerance threshold in response to the validation confidence score being higher than a defined score threshold; and decreasing the weight tolerance threshold in response to the validation confidence score being lower than the defined score threshold.

12. The system of claim 7, further comprising:

increasing the visual similarity threshold in response to the validation confidence score being higher than a defined score threshold; and decreasing the visual similarity threshold in response to the validation confidence score being lower than the defined score threshold.

13. One or more non-transitory computer-readable media containing, in any combination, computer program code that, when executed by a computer system, performs an operation comprising:

retrieving system-level transaction data;

receiving identity information related to a user;

responsive to receiving identity information related to the user, retrieving user-specific transaction data using the identity information;

determining one or more validation parameters based on the system-level transaction data and the user-specific transaction data, wherein the one or more validation parameters comprises at least one of a validation percentage, a weight tolerance threshold, or a visual similarity threshold;

calculating a security score based on the system-level transaction data;

calculating a trust score based on the user-specific transaction data;

generating a validation confidence score by combining the security score and trust score, wherein the validation confidence score is calculated as a weighted average of the security score and the trust score, wherein a weight is assigned to each respective score based on validation sensitivity; and adjusting the one or more validation parameters based on the validation confidence score;

selecting one or more items for validation within a self-checkout transaction, based on the validation percentage;

performing a validation check on each of the one or more items;

responsive to performing the validation check on each of the one or more items, calculating one or more validation performance indicators, the one or more validation performance indicators comprising at least one of a validation failure rate and a false intervention rate; and updating the system-level transaction data and the user-specific transaction data with the one or more validation performance indicators.

14. The one or more non-transitory computer-readable media of claim 13, further comprising:

performing a weight check on each of the one or more items, wherein the weight check further comprising:

detecting a weight of an item, from the one or more items;

retrieving an expected weight of the item from a database using a code associated with the item;

comparing the detected weight with the expected weight; and determining that a difference between the detected weight and the expected weight falls within the weight tolerance threshold.

* * * * *